United States Patent [19]

Borzym

[11] 4,301,723

[45] Nov. 24, 1981

[54] CYLINDER OPERATED SWINGING RAM CUTOFF PRESS

[76] Inventor: John J. Borzym, 4820 School Bell La., Birmingham, Mich. 48010

[21] Appl. No.: 136,200

[22] Filed: Apr. 1, 1980

Related U.S. Application Data

[63] Continuation-in-part of Ser. No. 799,204, May 23, 1977, abandoned.

[51] Int. Cl.³ .......................... B26D 7/26; B23D 25/06
[52] U.S. Cl. ..................................... 100/271; 83/320; 83/530; 83/630; 83/632
[58] Field of Search ................................ 100/270–272; 83/318, 319, 320, 530, 630, 637, 645

[56] References Cited

U.S. PATENT DOCUMENTS

| | | | |
|---|---|---|---|
| 2,433,672 | 12/1947 | May | 83/630 X |
| 3,288,011 | 11/1966 | Borzym | 83/319 X |
| 3,340,756 | 9/1967 | Mize | 83/320 X |
| 3,656,392 | 4/1972 | Kryntsky | 83/603 X |

*Primary Examiner*—James M. Meister
*Attorney, Agent, or Firm*—Krass, Young & Schivley

[57] ABSTRACT

A swinging ram type cutoff press for severing lengths of elongated stock such as tubing is provided of the type in which a ram is supported for swinging movement to operate a cutoff die set. The cutoff press includes a power cylinder combined with a toggle link arrangement to produce the swinging movement of the ram. The relative geometry of the ram link support and the toggle mechanism coupled with the arrangement of the cylinder is such that a complete ram motion cycle is carried out during a single forward or return stroke of the cylinder. The force exerted by the cylinder and toggle mechanism is not resisted either by return springs or the weight of the ram, thereby further maximizing the usable power of the power cylinder. Accordingly, one may reduce the cylinder size requirements for a given application. In addition, the mechanical advantage afforded by the toggle mechanism provides for a maximum force at the ram full down position to maximize the force available for the blade stroke. Cylinder size requirements are further reduced by an alternate form of toggle mechanism which compensates for the fact that the cylinder delivers less force on retraction than on extension of its output shaft.

13 Claims, 18 Drawing Figures

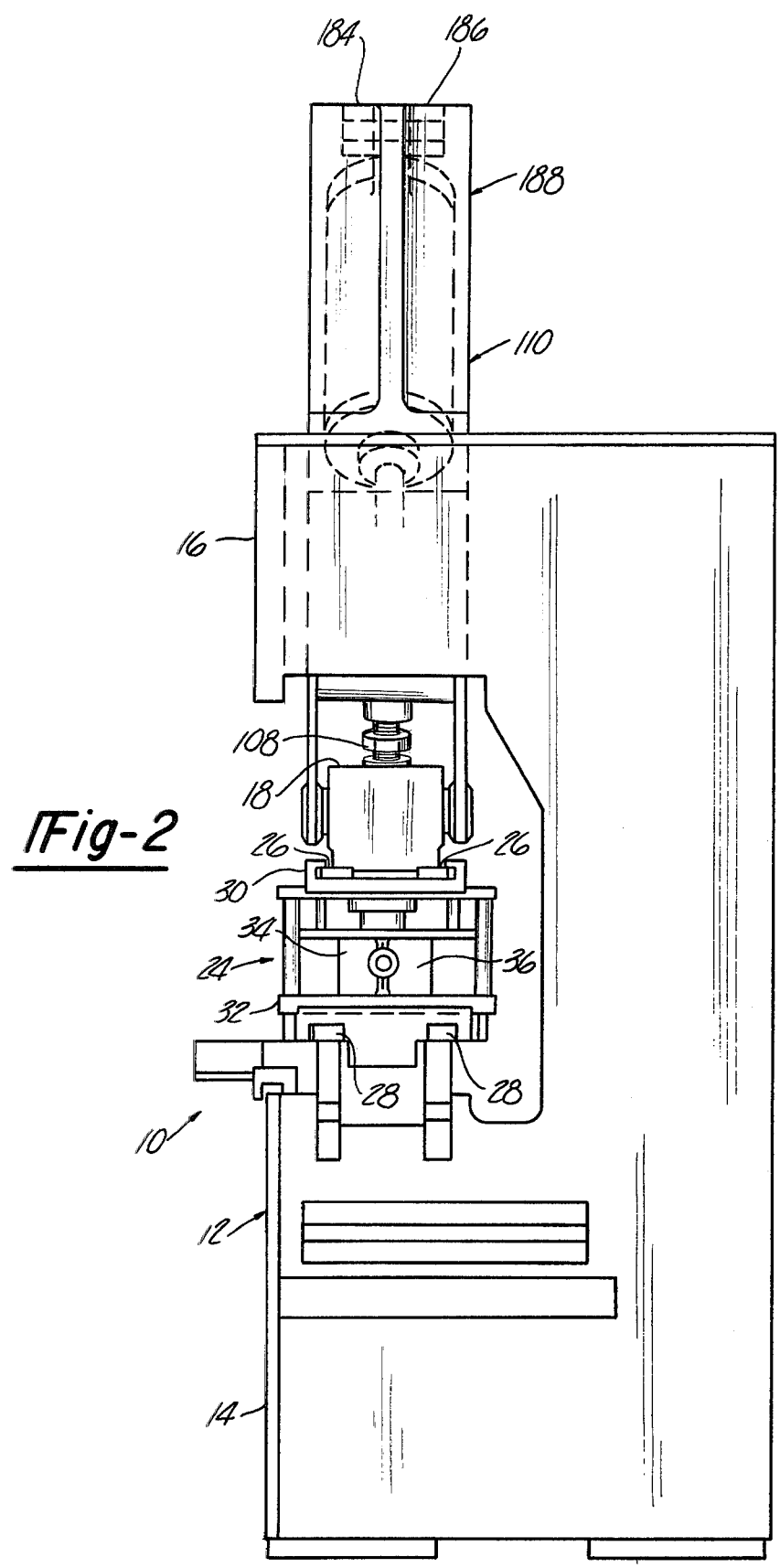

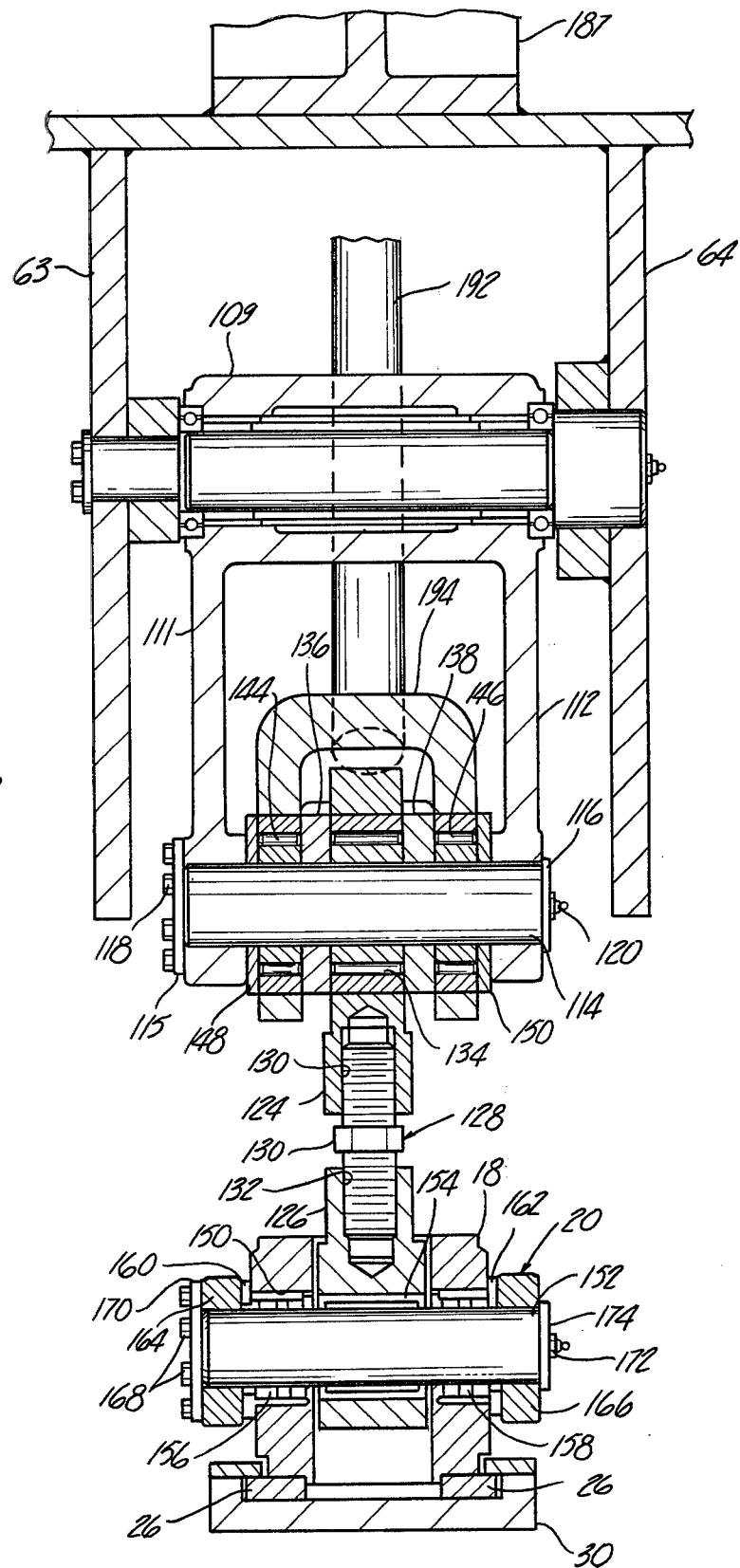

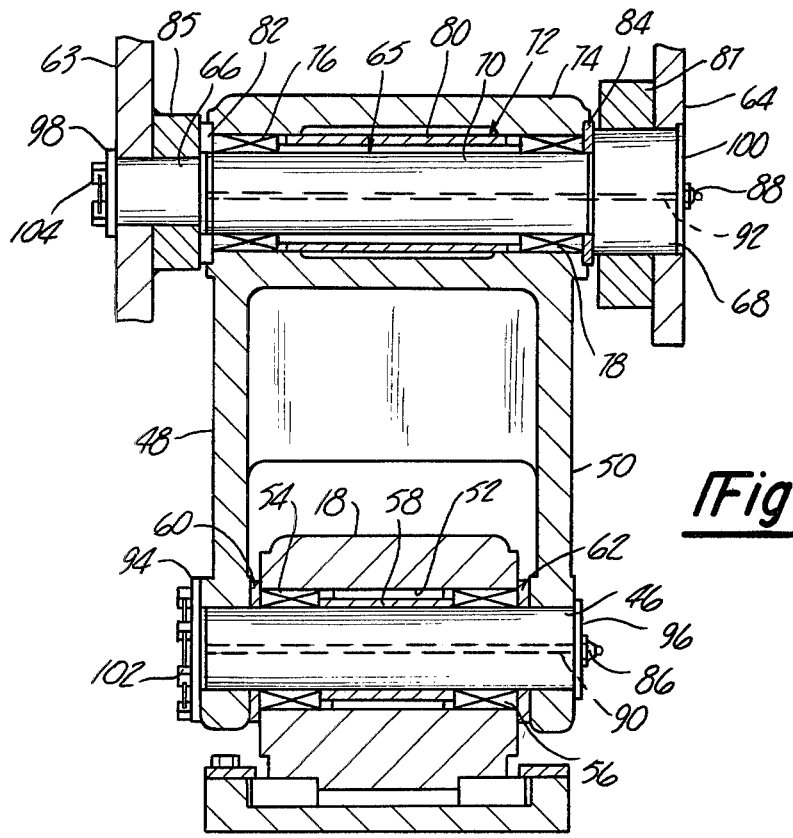

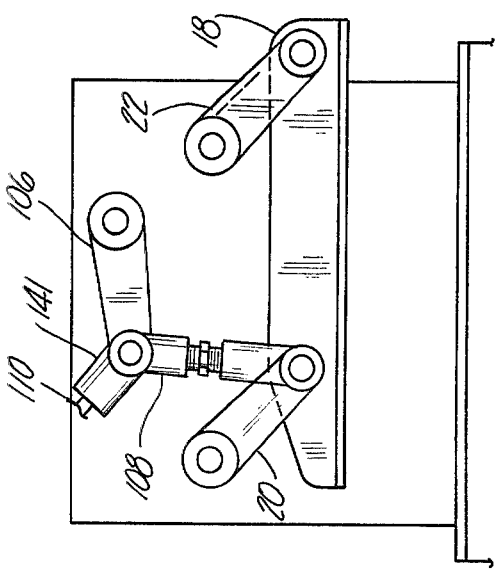
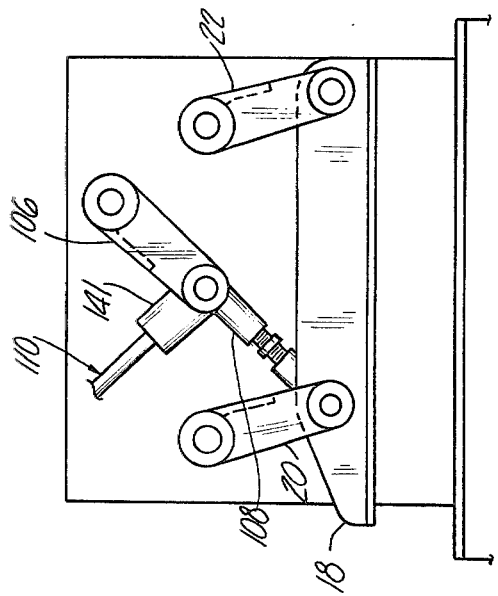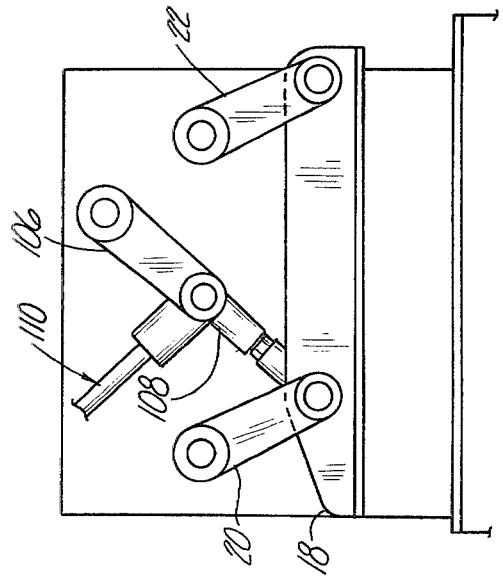

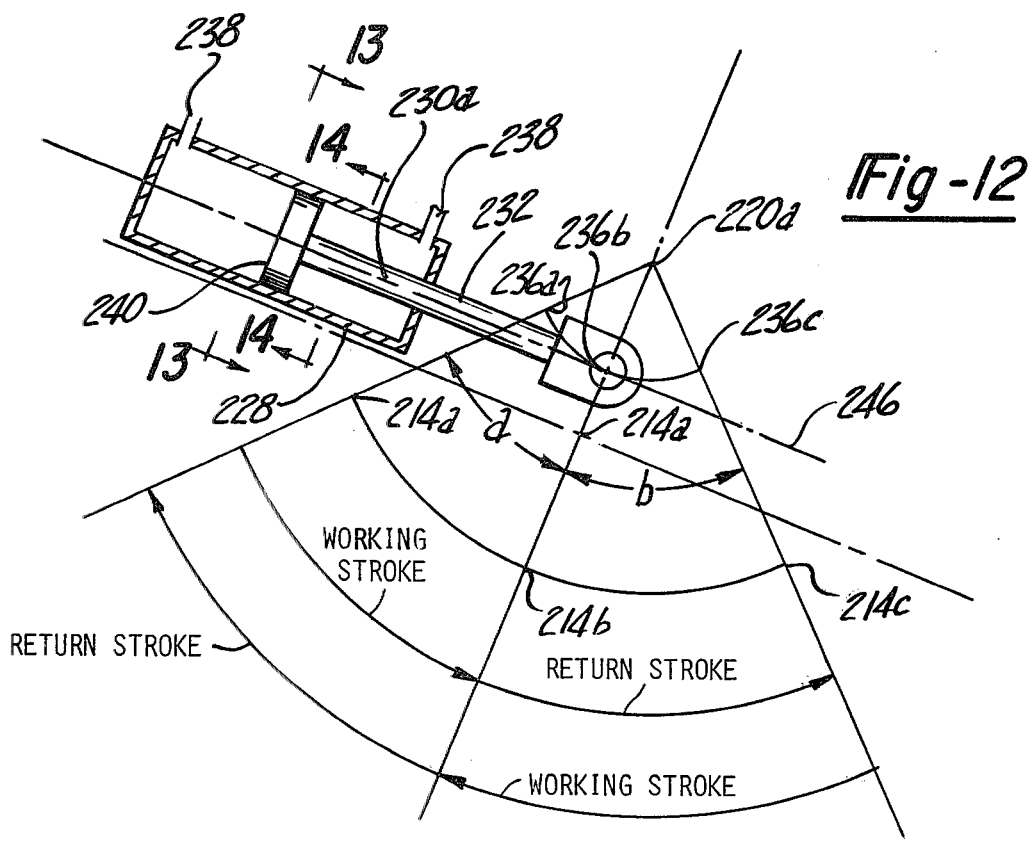
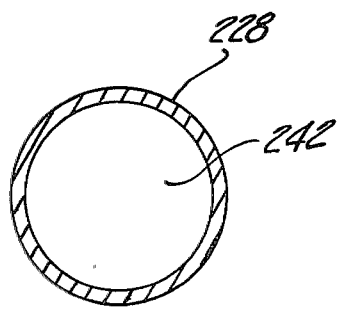
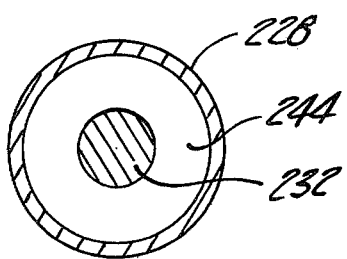

CYLINDER OPERATED SWINGING RAM CUTOFF PRESS

CROSS REFERENCE TO RELATED APPLICATIONS

This is a continuation-in-part of application Ser. No. 799,204 filed May 23, 1977, now abandoned.

BACKGROUND OF THE INVENTION

1. Field of the Invention

This invention concerns presses and more particularly presses having a ram which is mounted for swinging movement, such as is used in cutoff apparatus for severing lengths of elongated stock emanating from a tubing mill or other such source.

2. Description of the Prior Art

In the past, presses have incorporated rams operated by power cylinders, such as large diameter air cylinders. In these arrangements typically the ram would be mounted to the output member of the power cylinder, and the air cylinder would be stroked against the bias of return springs. The application of such cylinder-operated presses to tubing or other elongated stock cutoff apparatus has been limited for several reasons to relatively light duty situations. Firstly, the ram mechanism, if mounted directly to the output piston of the power cylinder has been limited in size by the size of the power cylinders, since the ram was typically guided in its stroke by the cylinder structure, or else additional ways or slides were by necessity required. Since the cost of power cylinders increases disproportionately with increasing cylinder bore size, it has been found to be economically unfeasible to operate rams over a certain size by means of air cylinders. In addition, the typical arrangement of stroking the press against the bias of return springs has the disadvantage that the available force of which the ram would be capable of exerting would be proportionately reduced as the return springs were compressed. This disadvantage is aggravated in the usual situation in which maximum force is required at the extreme position of the ram, and necessitates substantially increased cylinder size and/or operating pressure requirements to obtain force levels adequate to operate the cutoff die set.

In other contexts, power cylinders have been coupled with force-multiplying mechanisms, such as toggle link mechanism and the ram stroked vertically upward to obviate the need for return springs or double acting cylinders. However the weight of the ram in this design would also act to reduce the available force exerted by the ram as the ram was stroked by the power cylinder. In addition, the cylinder controls tended to be rather complex and subject to the burdensome maintenance requirements, since the cylinder would be depressurized and the return springs or ram weight utilized to return the ram to its initial position.

Still another problem associated with the use of so-called double action power cylinders of the type mentioned above relates to the fact that these cylinders normally deliver less force on the return or retraction stroke thereof than on their drive or extension stroke. This difference in stroke force is a consequence of the output shaft being directly secured to one face of the cylinder's piston. Since the output shaft must be of substantial cross sectional area in order to withstand the relatively heavy loading thereof, the amount of surface area upon which fluid may exert pressure is substantially less on the piston face to which the output shaft is connected compared to the opposite face. Thus, in the past, it was necessary to select a larger power cylinder whose return stroke force satisfied a particular application.

In some applications, the timing of the press operation is critical, as in those cutoff press apparatuses involving cutting on the fly or cutting of the stock as it rapidly emanates from a stock production mill, such as a tubing or extrusion mill, in which the entire cycle must of necessity be carried out with relatively precise timing. These design problems have limited the application of such cylinder-operated presses to the aforementioned stock cutoff applications.

In such apparatus, it has been the practice to provide a swinging ram type press in which a ram member has been supported on a pair of pivotal links which constrain the ram movement to that of a swinging motion about the pivotal support of the links, its pivotal movement producing both translation in the direction of the movement of the stock, as well as a reciprocation thereof of the ram transverse to the direction of movement of the stock. A typical example of such a press is disclosed in U.S. Pat. No. 3,288,011. In this design, the ram is driven so as to be swung or oscillated about these pivotally supported links by means of a crank mechanism driven by an electric motor and clutch, the crank mechanism being connected to the connecting rod to the ram to induce the swinging movement. The weight of the ram acts in concurrence with the downward and forward movement of the ram induced during the ram stroking in a forward direction, with the geometry of the links, etc. producing the full stroking of the ram without the need for reversal of the electric motor or precise control over the crank mechanism or electric motor and clutch.

The swinging movement of the ram in turn produces operation of the cutoff die set which is adapted to be reciprocated by the ram as it travels with the stock on an upper rail set carried by the ram and a lower rail set fixed to the machine base. The cutoff die set, as described in the aforementioned U.S. patent, includes means for initially clamping the die set to the stock to be severed, causing the die set to traverse the rail set together with the stock. Subsequently, downward movement of a cutoff blade, included in the die set is induced by the downward movement of the ram moving through its arcuate path as it swings about the pivotal supports provided by the pivotal links. Continued rotation of the eccentric crank drives the ram to its full down position with further rotation producing a reversal of movement of the swinging ram, to first withdraw the cutoff blade, then releasing the stock from the die set to allow it to be returned to its initial position by means of a return cylinder or other mechanism prior to initiation of a new cycle. A variation of that basic mechanism is disclosed in co-pending patent application, Ser. No. 715,559, filed Aug. 18, 1976, now U.S. Pat. No. 4,228,706. In that application an adjustable length connecting rod is provided which serves to provide a capability for shifting the segment of the arcuate path through which the ram is constrained to move by virtue of its support on the pivotally supported links, which shifting provides for adjusting the shut height or the position of the ram in its full down position, as well as the length of its stroke in such a way as to adapt the cutoff apparatus to die sets of varying configurations, to accommodate its application to varying tube size etc. in a manner described in that application.

While these machines have performed very satisfactorily and are adapted to reliably stroke the ram through its required swinging movement, the electric motor, clutch, and eccentric crank components comprise a considerable element of manufacturing cost in the apparatus.

On the other hand, while the aforementioned cylinder-operated presses suffer from the disadvantages described, they do exhibit the inherent advantage of a generally lower manufacturing costs, due to the use of simple power cylinders as a source of operating means for the ram where cylinders of a reasonable size are able to be utilized.

Accordingly, it is an object of the present invention to adapt a power cylinder to a swinging ram cutoff press of the sort described.

It is a further object of the present invention to adapt such power cylinder to the cutoff mechanism described in such a way as to not necessitate the use of complex controls or adversely affecting the reliability of the machine.

It is yet another object of the present invention to provide such an adaptation which does not involve the use of return springs tending to reduce the available force generated by the cylinder during stroking of the ram.

It is a further object of the present invention to incorporate a power cylinder operating device into a swinging ram type cutoff apparatus in such a way as to enhance the available force at that portion of the ram's stroke requiring maximum force to be exerted by the ram.

It is yet another object of the present invention to provide such an adaptation without entailing the incorporation of expensive and precision structural control components.

A still further object of the present invention is to provide a swinging ram apparatus driven by a power cylinder of the type delivering less force on its return stroke than on its extension stroke, in which means are provided for increasing the force transmitted to the ram on the cylinder's return stroke in order that a cylinder of minimal size may be effectively employed in each particular application.

SUMMARY OF THE INVENTION

These and other objects which will become apparent upon reading of the following Specification and Claims are accomplished by incorporating a power cylinder into a swinging ram press by providing a toggle link pivotally connected at one end to a connecting rod link, in turn pivotally connected to the ram, with the power cylinder pinned to the connected ends of the toggle link and connecting rod so as to act as a toggle mechanism upon stroking of the power cylinder. The relative geometry of the ram supporting links, the toggle link, the connecting rod link and the power cylinder is such that the toggle mechanism is at the extreme, advanced position of the ram, and the power cylinder executes its full oscillation of the ram upon a stroke in either direction to obviate the need for a reversal of the cylinder-operating member during the stroking of the ram. The connecting rod link is adjustable in length to provide a capability for adapting the cutoff apparatus to varying shut height and stroke requirements of differing die set sizes and configurations.

BRIEF DESCRIPTION OF THE DRAWINGS

FIG. 2 is a side elevational view of the swinging ram cutoff press, shown in FIG. 1.

FIG. 3 is a view of the Section 3—3, taken in FIG. 1.

FIG. 4 is a view of the Section 4—4, taken in FIG. 1.

FIG. 5 is a diagrammatic view of the swinging ram cutoff press, shown in FIG. 1, in an advanced position of the swinging ram.

FIG. 6 is a diagrammatic representation of the swinging ram, shown in FIGS. 1 through 5, with the swinging ram elevated by retraction of the power cylinder.

FIG. 7 is a diagrammatic representation of the swinging ram cutoff press, shown in FIGS. 1 through 6, with an adjustment of the length of the connecting rod link to produce a longer stroke, greater shut height stroking of the swinging ram.

FIG. 12 is a graphical representation showing the geometric relationship between the various components of the drive linkage, in operative relationship to the cylinder which is depicted in cross section.

FIG. 13 is a sectional view taken along the line 13—13 in FIG. 12.

FIG. 14 is a sectional view taken along the line 14—14 in FIG. 12.

DETAILED DESCRIPTION

Figure 1:
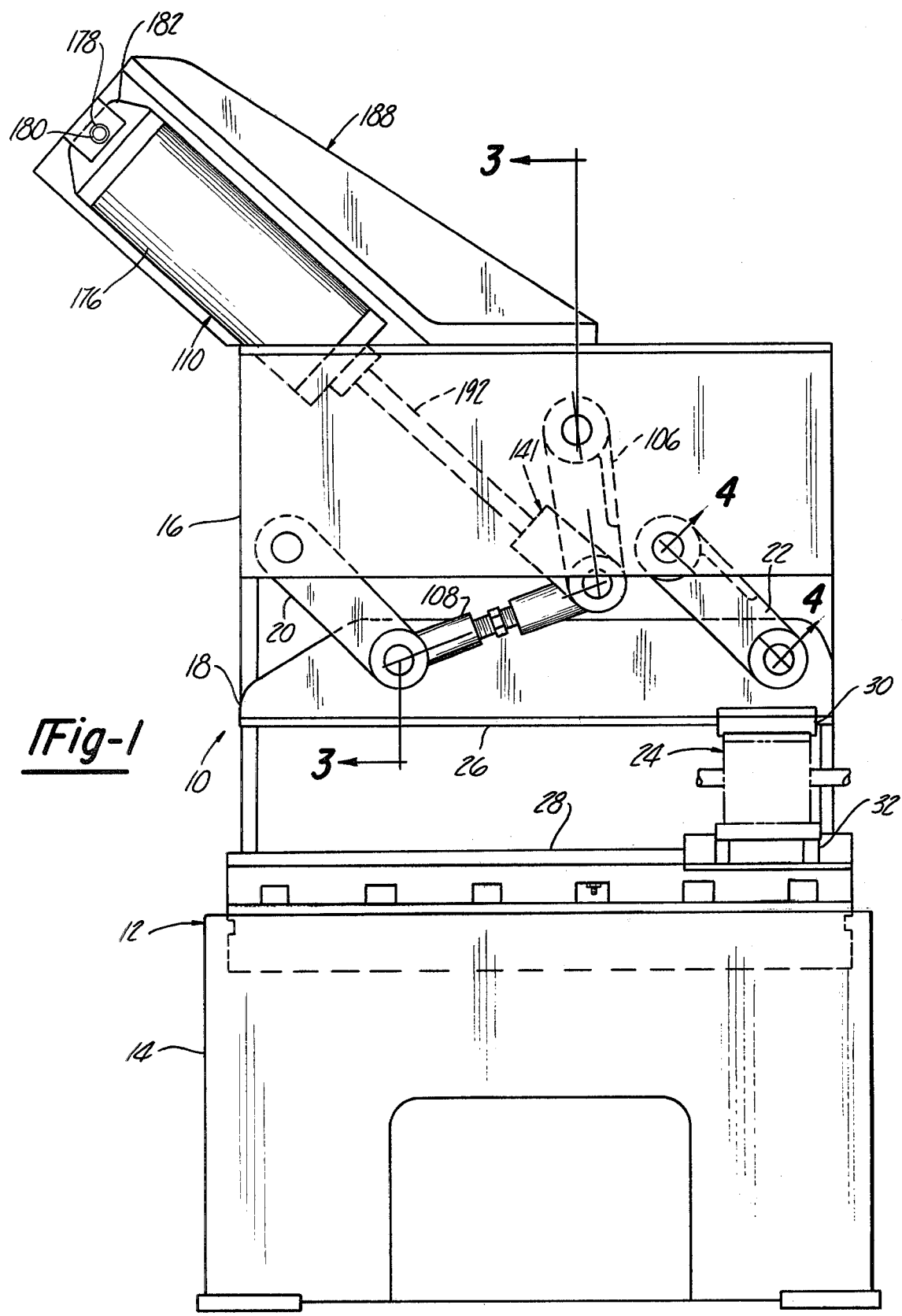
FIG. 1 is a front elevational view of a swinging ram cutoff press, according to one aspect of the present invention.

Referring to the drawings, and particularly FIGS. 1 through 4, the swinging ram cutoff apparatus 10, according to the present invention, is depicted. The cutoff apparatus 10 includes base support means 12 including a lower housing 14 and an upper housing 16, each comprised of a steel weldment. Supported on the upper housing 16 for swinging movement is a die set operating ram 18, the means providing the pivotal support being provided by a pair of pivotal links 20 and 22 pinned at one end to the upper housing 16 and at the other to the ram 18. This mode of support serves to constrain the ram to swinging movement through an arcuate path.

This swinging movement is adapted to operate a die set 24 which is retained between an upper rail set 26 affixed to the lower surface of the ram 18 and a lower rail set 28 affixed to the lower housing 14 by means of an upper die set carriage 30 and a lower die set carriage 32, as shown in FIGS. 1 and 2. The descending movement of the ram 18 created by its swinging motion reduces the clearance between the upper rail set 26 and lower rail set 28 which movement induces operation of the cutoff die set 24. This operation includes a movement of a pair of clamping jaws 34 and 36 upon initial downward movement of the ram 18 to clamp the die set 24 to the work W passing through the clearance space between the upper rail set 26 and the lower rail set 28, clutching the die set 24 to the workpiece W so as to cause it to move together therewith along the upper rail set 26 and the lower rail set 28.

Further downward movement of the ram 18 occurring as its swinging motion progresses causes operation of the cutoff blade 38 causing the severing of the work W within the die set 24. Upon reversal of movement of the ram 18, the cutoff blade 38 is initially withdrawn, then the clamping jaws 34 and 36 are operated to release the work W, all of this taking place before the die set 24 has reached its limit of travel on the upper rail set 26 and lower rail set 28. Upon release of the clamping jaws 34 and 36 a return cylinder, not shown, returns the die set 24 to its initial position, as shown in FIG. 1.

Since this aspect of the cutoff press per se does not comprise the present invention and inasmuch as the details of the same are now very well known to those skilled in the art, the specific design of the die set 24 and other structural details relating thereto are not here disclosed.

A pair of baffles (not shown) are typically provided to collect the cutoff slugs caused by shearing of the workpiece W, which may be collected into a bin, not shown, disposed within a cutout opening 44 in the front plate of the lower housing 14.

The links 20 and 22, as noted above, are pivotally supported on the upper housing 16 and also pivotally connected to the ram 18. FIG. 4 depicts in some detail the nature of these pivotal connections, with the connection of link 22 depicted as typical. Each of the links 20 and 22 are bifurcated into arms 48 and 50 to form a clevis at its lower end, receiving a pivot pin 46 passing through each arm 48 and 50 of the link 22 and also through a bore 52 formed in the ram 18. A pair of needle bearings 54 and 56 are provided to provide a rotatable support for the pivot pin 46 within the bore 52, with a spacer sleeve 58 provided to maintain the separation of needle bearings 54 and 56. A pair of thrust washers 60 and 62 are also included. The link 22 is pivotally supported at its other end within the upper housing 16 between a pair of end plates 63 and 64 forming part of the weldment of which the upper housing 16 is constituted, by means of a pivot pin 65 having end portions 66 and 68 disposed and retained between the end plates 62 and 64 with a central portion 70 passing through a bore 72 formed in the link end portion 74 joining the bifurcations 48 and 50.

A pair of needle bearings 76 and 78 are provided, maintained in axial position by means of a spacer sleeve 80. Thrust bearings 82 and 84 are also provided cooperating respectively with a boss portion 85 welded to end plate 62 and a shoulder formed by the enlarged diameter end portion 68 of the connecting pivot pin 70. A boss portion 87 is also provided receiving the end portion 68, as shown.

Lubrication fittings 86 and 88 may be provided in order to supply lube passages 90 and 92 formed internally in the pins 46 and 70, respectively. Suitable retainers 94, 96, 98 and 100 are provided to provide endwise or axial retention of the pivot pins 46 and 70, respectively, with the lube fittings 86 and 88 and cap screws 102 and 104 being provided to secure the respective retainers 94, 96, 98 and 100 to the link 22 and the upper housing 16, respectively.

The ram operating mechanism which is adapted to oscillate the ram through its swinging movement in the arcuate path through which it is constrained to move by the links 20 and 22, includes a toggle link 106, a connecting rod link 108 and an operating cylinder assembly 110. The toggle link 106 is mounted at one end to the upper housing 16 in a similar fashion as the links 20 and 22 by the journaling of an end section 109 in the side plates 62 and 64 included the upper housing 16 weldment. The toggle link 106 has bifurcated portions 111 and 112 which act as a clevis for a master pivot pin 114 retained in the outer end of bifurcations 111 and 112 by means of retainer plates 115 and 116 retained by cap screws 118 at one end and a lube fitting 120 at the other end in similar fashion to the other pivotal connections, described above.

Master pivot pin 114 has journaled thereon one end of the connecting rod 108. The connecting rod 108 is formed as two end portions 124 and 126 joined by an oppositely threaded adjusting rod 128 threadably received within bores 130 and 132 formed in the respective connecting rod ends 124 and 126. The threaded adjusting rod 128 having a central wrenching portion 130 so as to enable the threaded rod to be rotated to vary the effective length of the connecting rod 108. The upper end 124, as noted, is journaled on the master pivot pin 114, as shown, with bearing 134 provided and thrust spacers 136 and 138, intermediate the clevis 141 end portions 140 and 142 of the operating cylinder assembly 110, to be described further herein. The clevis portions 140 and 142 are similarly journaled by means of rotary bearings 144 and 146 receiving the master pivot pin 114 with thrust spacers 148 and 150 provided intermediate the bifurcations 110 and 112 of the toggle link 106 and the clevis portions 140 and 142 of the operating cylinder assembly 110.

The lower connecting rod end 126 is journaled within an opening 150 provided in the ram 18 in the region whereat a pivot pin 152 associated with the front pivotal link 20 is connected to the ram 18 so that the connecting rod 126 is also journaled on the pivot pin 152 as provides the pivotal support for the link 20. A needle bearing 154 is provided while separate bearings 156 and 158 are provided in appropriate openings in the bores in the ram 18 to provide a rotatable support of the ram 18 on the pivot pin 152. Retainer thrust bearings 160 and 162 are also provided to maintain the proper spacing between the ram 18 and bifurcated portions 164 and 166 of the pivot link 20. Cap screws 168 cooperating with a retainer plate 170 and a lube fitting 172 cooperating with a retainer plate 174 serves to retain the pivot pin 152 in the assemblage.

The power cylinder assembly 110 includes a power cylinder body 176 pivotally mounted at its rear portion by means of a pivot pin 178 passing through an opening 180 formed in a mounting plate 182 affixed to the rear of the power cylinder body 176. The pivot pin 178 is retained in a pair of clevis plates 184 and 186 welded to a mounting bracket 188 secured to the upper housing 16, as shown in FIGS. 1 and 2.

The power cylinder assembly 110 also includes an operating rod 192 connected to clevis end portions 140, 142.

In operation, the cylinder assembly 110 is in an initial position, either with the operating rod 192 in the fully extended position, as shown in FIG. 1, or fully retracted position, as shown in FIG. 6 in schematic form. In either the fully retracted or extended position, the ram 18 is in the full up position, with the toggle link 106 and connecting rod 108 askew, as shown in FIGS. 1 or 6. By initiation of a cutoff cycle, the cylinder assembly 110 is pressurized by means of solenoid control valves, not shown, to cause the operating rod 192 to be retracted or extended. The toggle link 106 and connecting rod link 108 are drawn into the aligned position, as shown in FIG. 1, with an increasing mechanical advantage characteristic of toggle mechanisms being imposed on the ram 18 through the connecting rod 108. A maximum mechanical advantage is achieved in the full down position of the ram 18 as depicted in FIG. 1, since the operating rod extends transversely to the aligned toggle link 106 and connecting rod link 108 and generally transversely to the pivotal links 20 and 22. Continued movement of the operating rod 192 again produces elevation of the ram 18 so that in the fully retracted or extended position, the ram 18 has again returned to the initial or up position. It must be seen that the power cylinder 110 need not be reversed during the cycling of the cutoff press, but in a single stroke produces both the down and up movement of the ram. Furthermore, the mechanical advantage is at a maximum when the force requirements are at a maximum, i.e., at the ram full down position. It should also be noted that the ram 18 weight does not work in opposition to the force applied by the power cylinder assembly 110 to further maximize the force able to be exerted by the power cylinder assembly 110 to the ram 18.

As described in the above referenced co-pending application Ser. No. 715,559, now U.S. Pat. No. 4,228,706, the adjustment of the connecting rod 108 produces a very advantageous flexibility in the application of any given press, since the shut height and stroke may be varied by means of the adjustability in length of the connecting rod 108. This can be seen by the schematic representation of FIG. 7 showing the adjustment rod 128 threaded fully into the connecting rod ends 124, 126 to reduce the connecting rod 108 length to a minimum. This produces an increased stroke, but instead of reducing the shut height, the shut height is increased, as shown in FIGS. 5 and 7. Thus, the advantages of the aforementioned application are likewise obtained in the arrangement disclosed.

The power cylinder assembly may be provided by an air cylinder, since the output requirements are reduced to a minimum by the disclosed arrangement, although hydraulic cylinders alternatively could be used if desired. In addition, the power cylinder assembly 110 would normally include means for controlling deceleration to control bounce at the end of the retraction or extension of the operating rod 192, but, since such devices are well known in the art, and many suitable designs are available, this device is not here described.

Attention is now directed to FIGS. 8–11 wherein a swinging type ram apparatus, similar to that previously described above, is depicted, having a novel drive link arrangement. The swinging ram includes a base 200 having a swinging ram 202 swingably mounted thereon by means of a pair of pivotal links 204 and 206, respectively.

A toggle link assembly, generally similar to that previously described, comprises a first and second drive link 208 and 210 respectively. The lower end of drive link 210 includes a bifurcated portion 212 defining a clevis in which there is journaled the upper end of drive link 208 by means of a pivot pin 214. A pair of thrust washers 216 maintain the drive link 208 spaced between the bifurcated portion 212 of drive link 210. The other end of drive link 208 is pivotally connected to the ram 202 in a manner similar to that previously discussed. The upper end of drive link 210 also includes a bifurcated portion 218 defining a clevis for pivotally mounting the drive link 210 on the base 200 by means of a pivot pin 220 journaled in a pair of spaced pillow blocks 222 secured to the top of the base 200. Bifurcated portions 218 are secured to a sleeve 224 which is rotatably carried on the pivot pin 220. A pair of thrust washers 226 are disposed between the pillow blocks 222 and opposite extremities of the sleeve 224.

Figure 8:
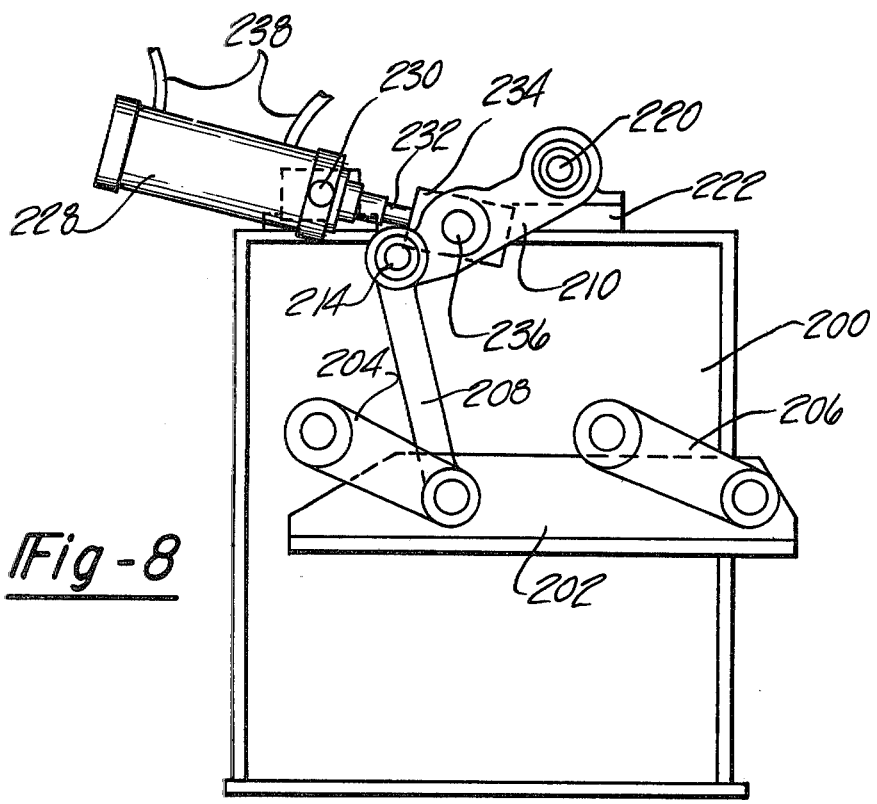
FIG. 8 is a front elevational view of a swinging arm apparatus, according to another aspect of the present invention in which novel drive linkage is employed for increasing the force transmitted to the ram during the return stroke of the power cylinder, the ram being shown in the raised, stand-by position with the cylinder in a retracted condition.
Figure 9:
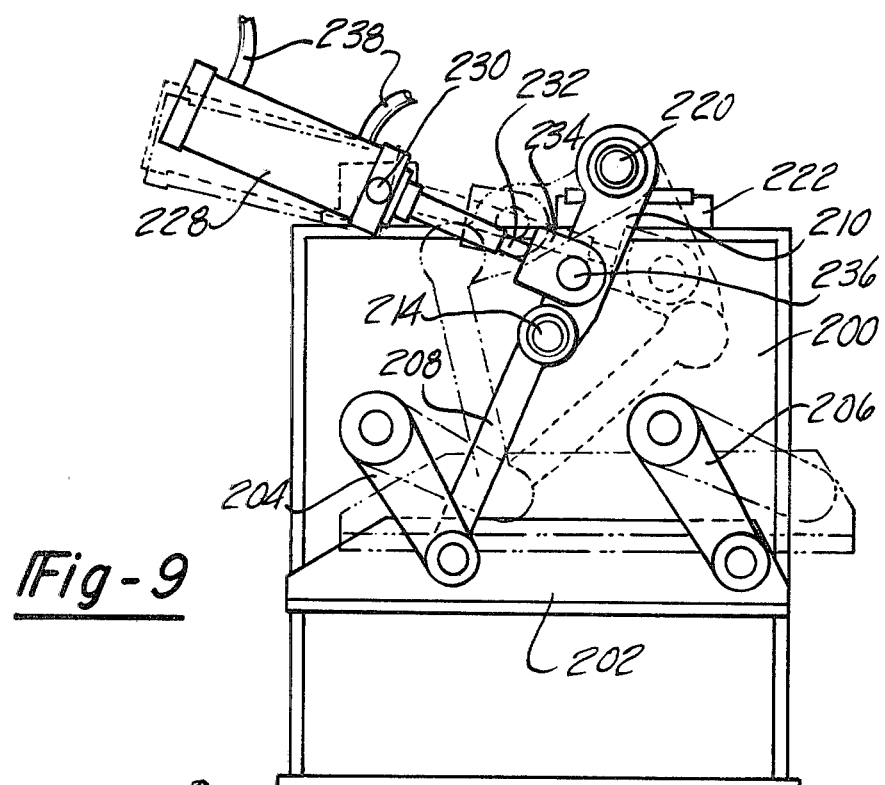
FIG. 9 is a view similar to FIG. 8 but showing the ram in a lowered, operated position in full lines with the output shaft of the cylinder being partially extended, the raised position thereof being indicated in broken lines.

A fluid operated power cylinder assembly 228 has a cylindrically shaped housing mounted by means of a pivot pin 230 on the base 220, and includes an output shaft whose outer free extremity is mounted by means of a clevis 234 and pivot pin 236 to the drive link 210, at a point spaced along the longitudinal axis of drive link 210 between pivot pins 214 and 220. Fluid cylinder assembly 228, whose construction will be discussed later in more detail, is similar to that previously described and is of the so-called double action type in which fluid from a pressurized source thereof (not shown) is selectively routed to either of fluid inlets 238 in order to selectively extend or retract the output shaft 232. As in the case of the swinging ram apparatus shown in FIGS. 1–7, the ram 202 completes a swing cycle through an arcuate path from a raised, stand-by position as shown in FIG. 8, to a lowered, operating position as shown in FIG. 9 on each extension or retraction of ourput shaft 232. In order words during each cycle, the ram 202 completes a downward working stroke and an upward return stroke each time the fluid cylinder 228 is actuated.

Figure 10:
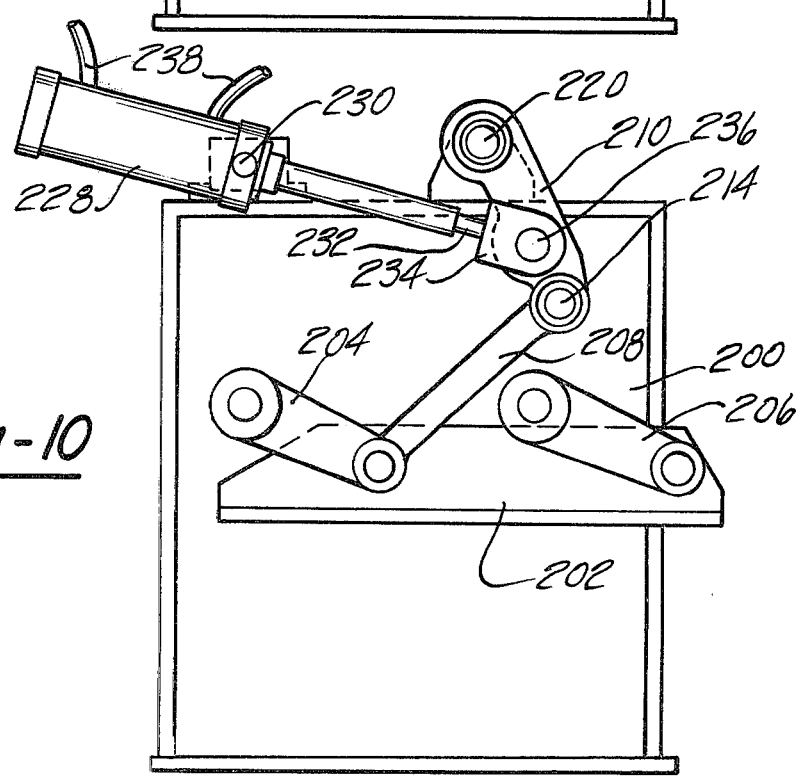
FIG. 10 is a view similar to FIG. 9 but showing the ram in raised, stand-by position with the output shaft fully extended.

FIGS. 8, 9 and 10 depict a sequence of a single swing cycle in which the output shaft 232 shifts from a retracted to an extended position. Turning attention now to FIGS. 12, 13 and 14, the fluid cylinder assembly 228 includes a piston member 240 presenting a pair of oppositely directed faces 242 and 244 respectively, each of which is generally circular in geometry and presents a surface against which pressurized fluid may exert pressure. One end of the output shaft 232 is secured to the face 244 of piston member 240. As shown in FIG. 14, output shaft 232 is concentrically disposed on face 244 and displaces a relatively substantial amount of surface area on face 244. Thus, although faces 242 and 244 are of equal diameters, the cross sectional area presented by face 244, upon which fluid may exert pressure, is substantially less than the surface area presented by face 242. As a result of the disparity between the surface areas of faces 242 and 244, the magnitude of fluid pressure exerted on face 242 exceeds that exerted on face 244 with the concomitant effect that the output shaft 232 delivers a greater amount of force to the toggle link assembly during extension thereof than the amount of force transmitted on its return ore retraction stroke. Consequently, in the past, it was necessary to employ a fluid cylinder whose return stroke power was matched to the power requirements of a particular swinging ram application. Thus, it was necessary to utilize a more powerful, and therefore more costly, power cylinder than was actually necessary.

One facet of the present invention involves the provision for increasing or multiplying the force transmitted by the output shaft 232 during the return or retraction stroke thereof. This is accomplished in the present invention by placing the pivotal connection between the output shaft 232 and drive link 210, i.e. pivot pin 236 at a location offset from pivot pin 214. The novel result afforded by this linkage arrangement is best understood by referring to FIG. 12, wherein the position of the pivot points corresponding to pivot pins 214, 220, and 236 are respectively designated by the same numerals. As shown in FIG. 12, the output shaft 232 shifts along its longitudinal axis 246, which axis 246 swings about pivot point 230. Pivot pin 236 is disposed at the location shown by the numeral 236a when the output shaft 232 is completely retracted prior to beginning a new stroke. As output shaft 232 begins to extend, pivot pin 236 shifts through an angle α from position 236a to position 236b which corresponds to the operated or downward-most position of the ram 202. During this first position of the cycle, the ram 202 completes a working stroke in the sense that mechanism (not shown) such as the previously discussed die set, is operated. Further extension of output shaft 232 causes pivot pin 236 to shift through an angle β from the position 236b to 236c which corresponds to the stand-by or raised position of the ram 202. This last portion of the cycle corresponds to the return stroke of the ram 202. During this first cycle, pivot pin 220 remains stationary while pivot pin 214 shifts through angle α from position 214a to 214b, thence through angle β to 214c.

Because of the novel placement of the pivot pin 236 with respect to the pivot pins 214 and 220, the angle β is less in magnitude than the angle α, or in other words, the angular displacement of the pivot pin 236 is greater during the return stroke of ram 202 than during the working stroke thereof. Likewise, when the output shaft 232 retracts such that pivot pin 236 successively shifts from the position 236c, to 236b and then to 236a, angle β exceeds angle α, as occurs during the extension of output shaft 232. The sum of angles α and β is 90°. Note that when the output shaft is extended such that pivot pin 236 is at 236b, the longitudinal axis 246 of the cylinder assembly 228 extends perpendicular to the longitudinal axis 247 of the drive link 210.

The difference in angular displacements of the pivot pin 236, through the angles α and β, is, of course, due to the novel linkage arrangement employed which results in equalization of the mechanical advantage generated by such linkage during the extension and retraction of output shaft 232. As a result of this equalization of mechanical advantage, the force transmitted from the output shaft 232 through the drive linkage to ram 202 during the working stroke associated with the retraction of output shaft 232 is at least equal to that during the extension thereof, in spite of the fact that the power output developed by cylinder 228 during the retraction thereof is less than that developed during its extension stroke. Consequently, it is possible to select a power cylinder of minimum power output capability for a particular application.

Figure 11:
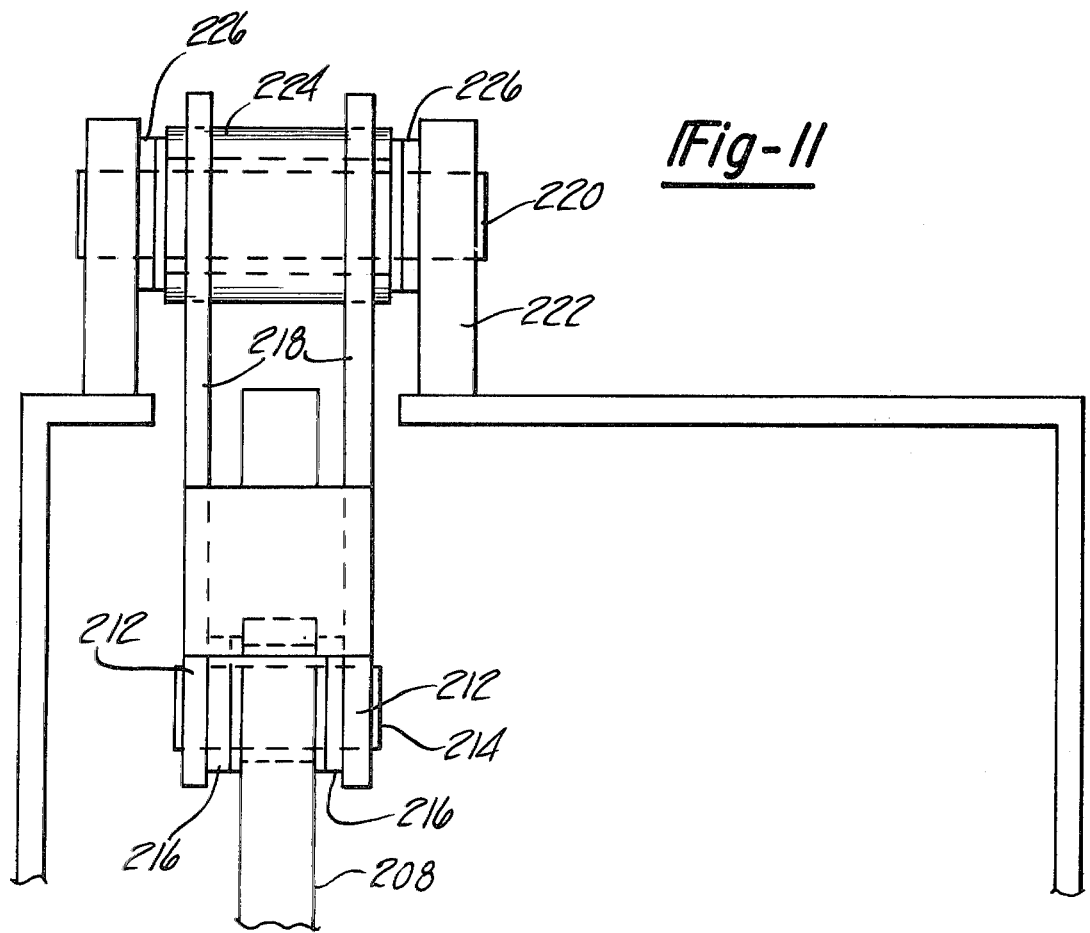
FIG. 11 is a fragmentary end view, taken on a larger scale, of upper portions of the swinging ram apparatus of FIG. 8.
Figure 15:
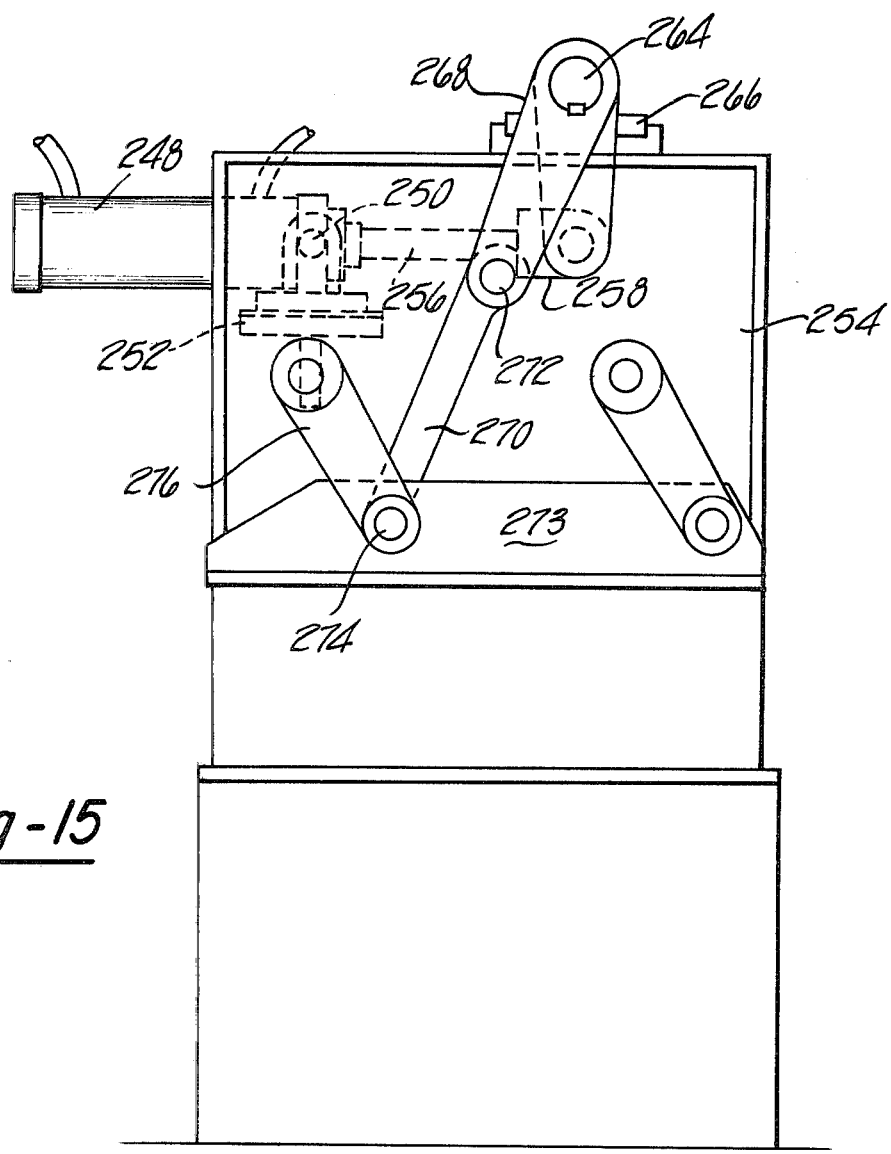
FIG. 15 is a front elevational view of a swinging arm apparatus including an alternate arrangement of the drive linkage.
Figure 16:
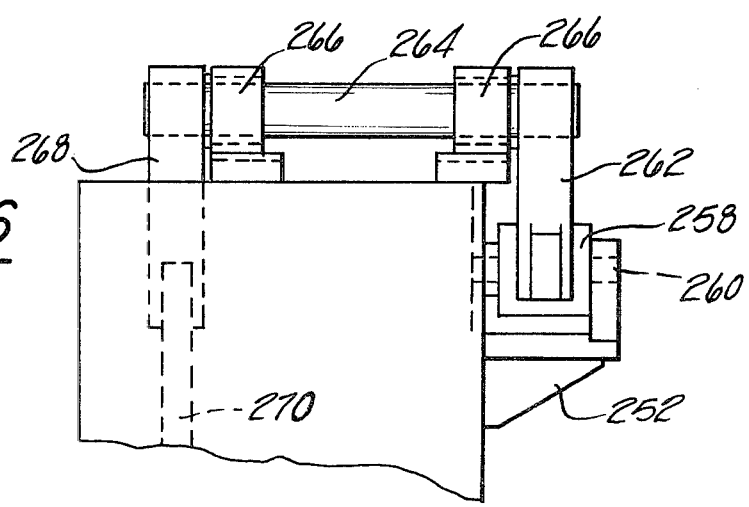
FIG. 16 is, a fragmentary, end view of upper portions of the swinging ram apparatus shown in FIG. 15.

As is apparent from FIGS. 8 and 11, a longitudinal axis of the output shaft 232, and drive links 208 and 210 lie essentially within the same plane. In some applications, however, it may be desirable to mount the power cylinder 228 near the rear of the apparatus, in spaced relationship to the drive links, and in this connection reference is now made to FIGS. 15 and 16 wherein one alternate form of the invention is depicted. As shown in FIG. 15, a power cylinder 248 such as that previously described is mounted for swinging movement via pivot pin 250 on a platform 252 secured to the backside of base 254. Cylinder 248 includes an output shaft 256 whose outer extremity is pivotally connected by means of a clevis 258 and pivot pin 260 to one end of a drive link 262, the opposite end of drive link 262 being secured to one end of a connecting shaft 264. Connecting shaft 264 extends traverse to the output shaft 256 and is journaled in a pair of spaced pillow blocks 266 mounted on the top of the base 254. The other end of the connecting shaft 264 has secured thereto one end of drive link 268, the opposite end of drive link 268 being pivotally connected to another drive link 270 via a pivot pin 272. The opposite end of drive link 270 is pivotally connected to ram 272 via pivot pin 274.

As best seen in FIG. 15, the longitudinal axes of drive links 262 and 268 are angularly offset with respect to shaft 264, while the longitudinal axes of drive links 268 and 270 are essentially collinear when output shaft 256 is fully extended and the ram 273 is in an operated, lowered position. Ram 273 is swingably secured to the base 254 by means of links 276 and 278, in a manner similar to that previously described with reference to FIG. 8. The drive link arrangement discussed immediately above produces a result similar to that associated with the arrangement depicted in FIGS. 8-10, i.e. the mechanical advantage generated by the linkage is such that the force transmitted to the ram 273 during the working stroke thereof while the output shaft 256 is retracting is essentially equal to that transmitted during the extension of output shaft 256.

Figure 17:
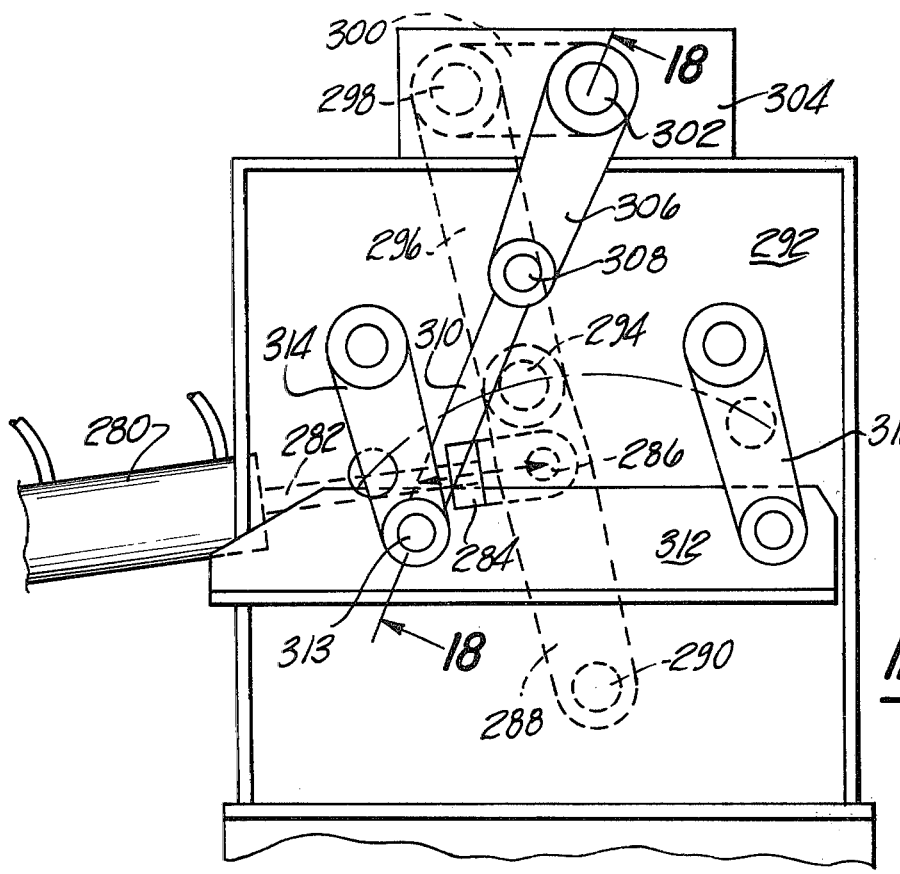
FIG. 17 is a front elevational view of a swinging ram apparatus including another alternate arrangement of the drive linkage.
Figure 18:
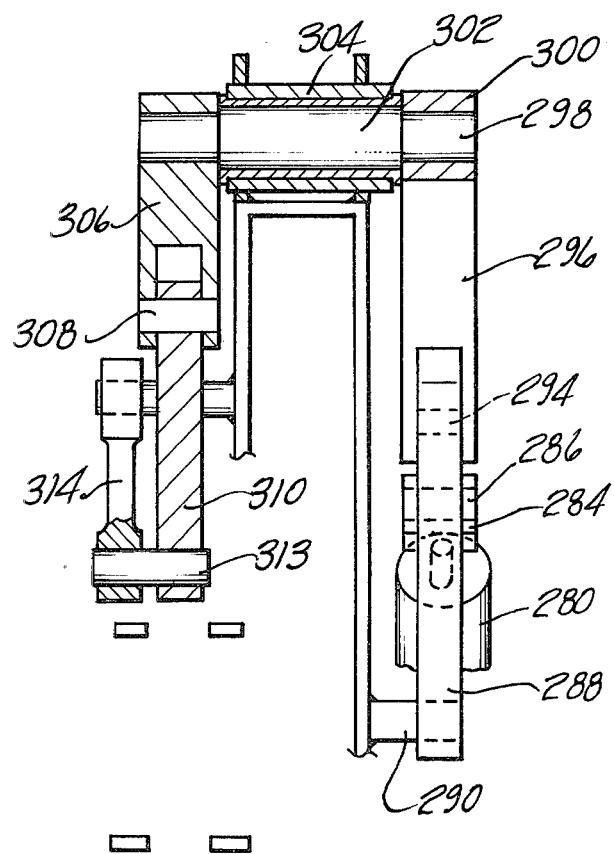
FIG. 18 is a fragmentary, end view of upper portions of the swinging ram apparatus of FIG. 17.

Reference is now made to FIGS. 17 and 18 where still another drive link arrangement is depicted which produces the desirable results afforded by the previously discussed embodiments shown in FIGS. 8-16. A power cylinder 280 mounted near the rear of the apparatus has one end of the output shaft 282 thereof pivotally connected by means of a clevis 284 and pivot pin 286 to an intermediate stretch of drive link 288. The lower end of drive link 288 is pivotally connected by pivot pin 290 to base 292, the opposite end of link 288 being pivotally connected by pivot pin 294 to drive link 296. The opposite end of drive link 296 is pivotally connected by pivot pin 298 to one end of a connecting link 300, the other end of connecting link 300 being secured to one end of connecting shaft 302. Connecting shaft 302 is journaled for rotation in a mounting block 304 secured on the top of base 292 and has the opposite thereof secured to one extremity of drive link 306. The other end of drive link 306 is pivotally connected by pivot pin 308 to one extremity of another drive link 310, the remaining end of drive link 310 being pivotally connected to ram 312 by pivot pin 313. Ram 312 is swingably mounted on base 292 by links 314 and 316. As shown in FIG. 17, the longitudinal axis of output shaft 282 extends generally perpendicular to the longitudinal axis of drive links 288 and 296 when output shaft 282 is fully extended with the ram 312 in its lowered, operated position. This drive link arrangement produces the desired mechanical advantage during the working stroke associated with the retraction of the output shaft 282 such that the force delivered to ram 312 during each working stroke thereof is essentially equal.

From the foregoing, it is apparent that the swinging ram apparatus described above not only provides for the reliable accomplishment of the objects of the invention, but does so in a particularly simple and cost-effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. A swinging ram apparatus, comprising:
    a base;
    a ram;
    means for mounting said ram on said base for swinging movement through an arcuate path between a stand-by position and an operated position, said mounting means including linkage pivotally connecting said ram to said base; and
    drive means for causing said ram to complete successive swing cycles through said arcuate path, each of said cycles including a working stroke in which said ram swings from said stand-by position thereof to said operated position thereof and a return stroke in which said ram swings from said operated position thereof to said stand-by position thereof,
    said drive means including double action, fluid operated motor means for causing said ram to swing, said motor means being mounted on said base and adapted to be operably coupled with a source of pressurized fluid, said motor means having a force transmitting reciprocable output shaft shiftable in one direction for causing said ram to complete a first swing cycle thereof and shiftable in the opposite direction for causing said ram to complete a second swing cycle thereof, the magnitude of force transmitted by said output shaft when the latter shifts in said one direction thereof being greater than the magnitude of force transmitted thereby upon shifting thereof in said opposite direction,
    said drive means further including means connecting said output shaft with said ram for increasing the magnitude of force transmitted from said output shaft to said ram during the working stroke of said second swing cycle, whereby said drive means transmits essentially magnitudes of force to said ram during each working stroke thereof.

2. The apparatus of claim 1, wherein said motor means comprises a cylinder pivotally mounted on said base and having a piston member shiftably confined therewithin, said piston member presenting a pair of opposed faces upon which fluid pressure may be exerted, one extremity of said output shaft being connected to one of said pair of faces, said one face having a surface area less in magnitude than that of the other face of said pair thereof whereby the total pressure exerted by said fluid on said one face is less than that exerted on said other face.

3. The apparatus of claim 2, wherein:
    said force increasing means comprises a first and second drive link having adjacent ends thereof pivotally connected to define a pivot point, the opposite ends thereof being respectively pivotally connected to said ram and to said base and respectively defining second and third pivot points, and
    the opposite extremity of said output shaft is pivotally connected with one of said first and second drive links at a location spaced from a first reference axis disposed perpendicular to a second reference axis extending through said second and third pivot points.

4. The apparatus of claim 3, wherein:
    said opposite extremity of said output shaft is pivotally connected to said second drive link, and
    said first, second and third pivot points are essentially aligned with each other along said second reference axis and the longitudinal axis of said output shaft extends essentially perpendicular to said second reference axis when said ram is disposed in said operated position thereof.

5. The apparatus of claim 4, wherein said longitudinal axis of said output shaft and the longitudinal axis of said first and second drive links are essentially coplanar.

6. The apparatus of claim 2, wherein said force increasing means comprises:
    a first and second drive link having adjacent ends pivotally coupled with each other to define a first pivot point, the other end of said first drive link being pivotally coupled with said ram to define a second pivot point,
    a connecting shaft having the other end of said second drive link secured thereto, and
    a third drive link having one end thereof pivotally coupled with the opposite extremity of said output shaft to define a third pivot point, the other end of said third drive link being secured to said connecting shaft.

7. The apparatus of claim 6, wherein the distance between the longitudinal axis of said connecting shaft and said first pivot point is greater in magnitude than the distance between said last mentioned axis and said third pivot point.

8. The apparatus of claim 7, wherein:
    the longitudinal axis of said second and third drive links are angularly offset with respect to each other about the longitudinal axis of said connecting shaft, and
    the longitudinal axis of said output shaft extends essentially perpendicular to a reference axis extending between said third pivot point and the longitudinal axis of said connecting shaft.

9. The apparatus of claim 2, wherein said force increasing means comprises:
    a first and second drive link having adjacent ends pivotally coupled with each other to define a first pivot point, the other end of said first drive link being pivotally coupled with said ram to define a second pivot point,
    a connecting shaft having the other end of said drive link secured thereto,
    a third drive link having one end thereof secured to said connecting shaft, and
    a link assembly coupled between the other end of said third drive link and said base, the opposite end of said output shaft being pivotally coupled with said link assembly.

10. The apparatus of claim 9, wherein said link assembly comprises a fourth and fifth drive link pivotally coupled with each other, one end of said fourth drive link being pivotally coupled with said third drive link, one end of said fifth drive link being pivotally coupled with said base.

11. The apparatus of claim 1, including a cutoff die set.

12. The apparatus of claim 3, including means for adjustably varing the length of one of said first and second drive links, whereby said arcuate path may be shifted to allow variation in operated position of said ram.

13. The apparatus of claim 1, wherein:

said linkage includes a plurality of links each having the opposite extemities thereof respectively pivotally connected to said ram and to said base;

said linkage comprising a toggle link pivotally connected to said base, a connecting rod link having one end thereof pivotally connected to said ram, the other end of said rod link being pivotally connected to said toggle link, said rod link and said toggle link being mounted to be aligned with each other and in a position extending transverse to each of said plurality of links when said ram is in said operated position thereof.

* * * * *

UNITED STATES PATENT AND TRADEMARK OFFICE
CERTIFICATE OF CORRECTION

PATENT NO. : 4,301,723

DATED : November 24, 1981

INVENTOR(S) : John J. Borzym

It is certified that error appears in the above-identified patent and that said Letters Patent are hereby corrected as shown below:

In The Abstract:
Line 2, "provided" should be --disclosed--.
Line 4, "The cutoff" should be --The disclosed cutoff--.

In The Specification:
Column 3, line 37 "structural control" should be --structural or control--.
Column 4, line 47 "arm" should be --ram--.
Column 4, after "DETAILED DESCRIPTION" please insert the following paragraph: --In the following detailed description certain specific terminology will be utilized for the sake of clarity and a particular embodiment described in accordance with the requirements of 35 USC 112, but it is to be understood that the same is not intended to be limiting and, indeed, should not be so construed, inasmuch as the invention is capable of considerable variation within the scope of the appended claims-.
Column 8, line 27 "220" should be --200--.
Column 8, line 43 "ourput" should be --output--.
Column 8, line 43 "order" should be --other--.

In The Claims:
Claim 1, line 53 "essentially magnitudes" should be --essentially equal magnitudes--.

Signed and Sealed this

Sixteenth Day of March 1982

[SEAL]

Attest:

GERALD J. MOSSINGHOFF

Attesting Officer

Commissioner of Patents and Trademarks